(12) United States Patent
Carlson et al.

(10) Patent No.: US 7,080,355 B2
(45) Date of Patent: Jul. 18, 2006

(54) TARGETED ASSET CAPTURE, IDENTIFICATION, AND MANAGEMENT

(75) Inventors: Brent Carlson, Rochester, MN (US); Tim Graser, Rochester, MN (US); Debra Mariner, Oronoco, MN (US); John Palof, Kenyon, MN (US); Paul Tamminga, Rochester, MN (US)

(73) Assignee: LogicLibrary, Inc., Oakmont, PA (US)

( * ) Notice: Subject to any disclaimer, the term of this patent is extended or adjusted under 35 U.S.C. 154(b) by 594 days.

(21) Appl. No.: 09/900,101

(22) Filed: Jul. 6, 2001

(65) Prior Publication Data

US 2003/0009455 A1   Jan. 9, 2003

(51) Int. Cl.
*G06F 9/44* (2006.01)
(52) U.S. Cl. ..................................... 717/120
(58) Field of Classification Search ................ 717/120, 717/102
See application file for complete search history.

(56) References Cited

U.S. PATENT DOCUMENTS 5,980,096 A * 11/1999 Thalhammer-Reyero .... 707/100
6,023,702 A * 2/2000 Leisten et al. ............... 707/100
6,067,548 A * 5/2000 Cheng ..................... 707/103 R
6,427,230 B1   7/2002 Goiffon et al.
6,678,882 B1 * 1/2004 Hurley et al. ............... 717/121
2002/0073114 A1   6/2002 Nicastro et al.
2002/0156702 A1  10/2002 Kane
2002/0158880 A1* 10/2002 Williams et al. ............ 345/582
2002/0169658 A1* 11/2002 Adler .......................... 705/10

\* cited by examiner

*Primary Examiner*—John Chavis

(74) *Attorney, Agent, or Firm*—Shumaker & Sieffert, P.A.

(57) ABSTRACT

A targeted asset capture system that maps software resources to a domain model, and search and management tools for retrieving asset information and controlling asset acquisition. The domain model may include a process-centered organization and/or a structural organization of model tasks, functions, and data types. Capture includes mapping to the model functions and data types, and preferably also includes capturing other information about the asset and about the quality of mapping. The domain model may be used to build a search specification for searching for available assets that meet some or all of a set of functional (and/or nonfunctional) requirements. The search specification may also be published in part or in whole as a development specification.

52 Claims, 27 Drawing Sheets

| TCS Details - Microsoft Internet Explorer |
|---|

File Edit View Favorite Tools Help

| Search Categories ▼ | |
|---|---|
| [SEARCH] | |
| Logic Library Web | |
| Information Center | |
| Support Center | |
| TCS | |
| TAGS | |
| Organizational Groups | |
| Asset Views | |
| Profiles | |
| Projects | |
| Users | |
| Non-Functional Requirements Sets | |
| TCS/TAQS Status | |

+TCS Detail [Delete] [Save As] [Run]

| Project | Finance Project |
|---|---|
| Project Manager | Joe Williams |
| Description | Account reporting |

| TCS Name | CurrConv |
|---|---|
| Description | Currency conversion |
| Status | Active |
| DRM | IndLifeInsDRMSample |
| Create Date | Tues May 01 16:09:59 CDT 2001 |
| Last Modified Date | Tues May 01 16:09:59 CDT 2001 |

Non-Functional Requirements  [Edit]

Target Functions  Edit

| Function Name | Weight |
|---|---|
| 80 { PolicyRecordManagement:PolicyRecordFunctions:GetNRAStatus | 5 |
| CurrencyManagement:CurrencyExchangeFunctions:add ExchangeRate | 5 |

Scoring Parameters

| Asset level affinity threshold | 50 —— 82 |
|---|---|
| Functions level affinity threshold | 9 |
| Allow functions with partial functionality | Yes } 84 |
| Allow functions with additional functionality | Yes |

Fig. 18

| TCS Detail - Microsoft Internal Explorer |
|---|

File Edit View Favorite Tools Help

| Users |
|---|
| Non-Functional Requirements Sets |
| TCS/TAGS Status |

DRM        IndLifeInsDRMSample
Create Date    04/05/01
Last Modified Date  04/05/01

Non-Functional Requirements    Edit

Target Functions    Edit

| Function Name | Weight |
|---|---|
| DetermineFederalWithholdingAmount:FederalWithholdingTaxFunctions:DetermineRequiredFWT | 9 |
| PolicyRecordManagement:PolicyRecordFunctions:GetTaxIDNumber | 3 |

Scoring Parameters

| | |
|---|---|
| Asset level affinity threshold | 50 |
| Function level affinity threshold | 9 |
| Allow functions with partial functionality | Yes |
| Allow functions with additional functionality | Yes |

Attached Assets

| Name | Version | Description | Supplier | Type | Library |
|---|---|---|---|---|---|
| Customer Profile | 1.0 | Organizes customer information (addresses, phone numbers, etc) | IBM | JSP | B |
| Product Catalog | 1.1 | Organizes product information (categories, product details, cross-sell info, etc.) | IBM | JSP | A |
| Tax Bridge | 1.0 | Tool for life insurance companies to administer policy level taxation in a compliant manner | Practical Computing, Inc. | EJB | A |

Delete  Save As  Run

Fig. 21

Asset Name:     Asset 1
Asset Version:  V1.0
Description:    This is Asset 1

Note: _____.
      _____.

Carol McGrath   "Pending Approval" Monday, February 26th, 2001  9:15 am
This component meets both the technical and business requirements for our project. We need a license ASAP as this is a time critical project.

[ Close ]

Fig. 25

Search for:
Asset License(s)

[ Search ]

[ LogicLibrary Web ]
[ Information Center ]
[ Support Center ]
[ Asset Licenses ]
[ Asset Requests ]

Add New Company-Wide Asset License

Save  Clear

Library : [ Library ID  Library Name  ▼ ]
Asset: [ Asset Name & Version  Description  ▼ ]

License Data: _____
_____
_____

Purchaser Note: _____
_____
_____

[ Save ]  [ Clear ]

Fig. 26

Search for:

Published Assets ▼

[ Search ]

LogicLibrary Web

Information Center

Support Center

Organizational Groups

Asset Views

Profiles

Projects

Users

Non-Functn'l Req Sets

Reports

TCS/TAQS Status

Angela's Published Assets

| Asset Name | Version | Description | Last Published Date |
|---|---|---|---|
| Asset 1 | V1.0 | This is Asset 1 | Published 2/21/01 |
| Asset 3 | V3.1 | This is Asset 3 | Published 3/01/01 |
| Asset 4 — 134 | V2.2 | This is Asset 4 | Published 3/05/01 |

Un-Published Assets in Repository

| Asset Name | Version | Description | Publish Asset |
|---|---|---|---|
| Asset 2 | V1.0 | This is Asset 2 | Published |
| Asset 5 | V0.9 | This is Asset 5 | Published |

TARGETED ASSET CAPTURE, IDENTIFICATION, AND MANAGEMENT

FIELD OF THE INVENTION

The present invention relates to the creation and maintenance of software libraries, and in particular to improved methods and software for categorizing, retrieving, and managing resources such as software components, services and applications within a particular domain such as a business area.

BACKGROUND OF THE INVENTION

In the past twenty years, software development projects have grown from small projects executed by one or two programmers in a period of weeks or months to huge endeavors involving dozens of programmers and millions of lines of code. As organizations develop increasingly large libraries of past projects, it becomes more and more difficult to apply past solutions to new problems. In a one- or two-person environment, a programmer could often remember that a particular function had previously been created, and could locate the old code relatively easily. With the advent of object-oriented programming and multiuser development environments, the number of software objects an enterprise may own has increased exponentially, while the ability of any particular user to remember or find legacy code has diminished.

Various tools have been developed to help organizations keep track of software resources to avoid reinventing the wheel with each new project. These usually take the form of software libraries, which are typically organized by project and/or broad function. It is often difficult to find in many libraries "elemental" functions that may be used in a wide variety of different types of code, such as currency- or time-handling functions. Further, the organization of the libraries makes it difficult for anyone but a programmer who is already somewhat familiar with the assets to identify useful resources.

It is an object of the present invention to provide an improved system for managing software resources. Preferably, such a system should allow nonprogrammers to collaboratively participate in the search for needed functionality and identify available resources that will minimize the amount of new effort required for development projects.

SUMMARY OF THE INVENTION

The invention includes a targeted asset capture system that maps software resources to a domain model, and search and management tools for retrieving asset information and controlling asset acquisition. The domain model may include a process-centered organization and/or a structural organization of model tasks, functions, and data types. Capture includes mapping to the model functions and data types, and preferably also includes capturing other information about the asset and about the quality of mapping. The domain model may be used to build a search specification for searching for available assets that meet some or all of a set of functional (and/or nonfunctional) requirements. The search specification may also be published in part or in whole as a development specification.

In one aspect, the invention comprises an asset capture software utility. The utility includes a database for cataloguing software resource information, and means for mapping functions and data types to a predetermined domain model. The domain model may be a two-part model comprising a process model and a structural model, which may be linked to one another. There may be multiple process models for a single structural model. The utility may use synonyms to suggest mappings to the domain model. The mapping means may include means for adding user comments, such as comments on the character or quality of the mapping or on the usage or purpose of certain functions and data types.

In another aspect, the invention comprises a database of resource information, where the resource information includes functionality information mapped to a predetermined domain model. The database may include a search engine, for example an engine that can score resources according to how well they match functional or nonfunctional requirements. The search engine may include means for creating a persistent search specification that can be used by multiple users. Individual resources may be attached to the search specification for consideration. The search specification may be publishable, in whole or in part, as a requirements specification for software development. The search engine may notify one or more users of additions to the database that match a persistent search specification. Functionality information may be mapped over multiple domain models. The database may include means for viewing the domain model (e.g., graphically) in order to specify a search. The means may include means of navigating between process-side and structural-side of a domain model. The database may also include resource usage information, which may be linked to projects and may include information such as licensing data, resource acquisition tools, and usage reporting tools.

In a further aspect, the invention includes methods of classifying resources against a domain model, by mapping resource data types to model data types and resource functions to model functions, and storing the results in a searchable database. The domain model may include a process model and a structural model, which may be linked together. Multiple process models may also be linked to a single structural model. The method may include using synonyms to search model function and data type descriptions. Comments may be added to the database, for example on the quality of the mapping or on individual function or data type usage or purposes. The method may also include forwarding asset acquisition requests to an acquirer and storing acquisition information such as license keys. The method may also include generating usage reports or acquisition request reports.

In still another aspect, the invention includes methods of managing resources within an enterprise, by maintaining a searchable database of resource information including location information and functionality information, the functionality information being mapped to a domain model. The methods may include searching the database for resources that match functional or nonfunctional requirements, for example by creating a persistent search specification. A persistent search specification may be shared between users and/or published as a requirements document. Assets may be attached to the persistent search specification, and the method may include publishing the portions of the specification that are not matched by the attached assets. One or more users may also be notified when resources are added to the database that match the persistent search specification. The method may further include forwarding requests for resource acquisition to an acquirer, and storing acquisition information such as license keys. The method may also include generating reports on acquisition requests and/or resource usage.

In yet another aspect, the invention includes methods of mapping software resources to a domain reference model, including determining functions and data types to be mapped, sorting them into an order from most simple to most complex, and presenting them to a user in the determined order for mapping. As the user is presented with individual functions and data types, previously created mappings are used to refine further mapping suggestions. The determined order may include, for example, viewing all data types before viewing functions. The user may elect to map functions and data types in a different order.

BRIEF DESCRIPTION OF THE DRAWING

The invention is described with reference to the several figures of the drawing, in which.

FIG. 18 is a window showing a constructed search specification using DRM functions;

FIG. 21 is a window showing attachment of resources to a search specification;

FIG. 25 is a window showing the details of requests for a pending asset;

FIG. 26 is an asset acquisition screen; and

FIG. 27 is a window showing an asset usage summary.

DETAILED DESCRIPTION

Domain Reference Model

The asset capture and identification tools of the invention allow resources to be mapped to a domain reference model (DRM). The DRM may be built in commercially available standalone software, such as Rational Rose, available from Rational Software of Lexington, Massachusetts, or may be directly integrated as a part of a standalone tool.

A DRM identifies both atomic and higher-level tasks or process elements. Preferably, these elements are organized in two different models. The first model is the structural model, which is similar in organization to a library of code components. Each reference component in the structural model contains one or more functions applicable to the domain. These functions may be organized in intermediate groupings called interfaces that associate functions according to expect usage patterns or other criteria. However, the components defined in the structural model are not actually implemented as executable code, but simply serve as a reference model of possible functions within the domain.

The second model is generally a business process model, which identifies higher-level areas within the domain and breaks them into processes and subprocesses. At the atomic level, the processes are broken clown to "use cases," which detail the necessary steps of a particular task. These steps are associated with the components, interfaces, and functions in the structural model, and may be repeated in different combinations in the various use cases. The model need not be organized around a business structure, but may comprise any appropriate topical organization (e.g., a technical reference architecture for software component implementation and deployment).

Figure 1:
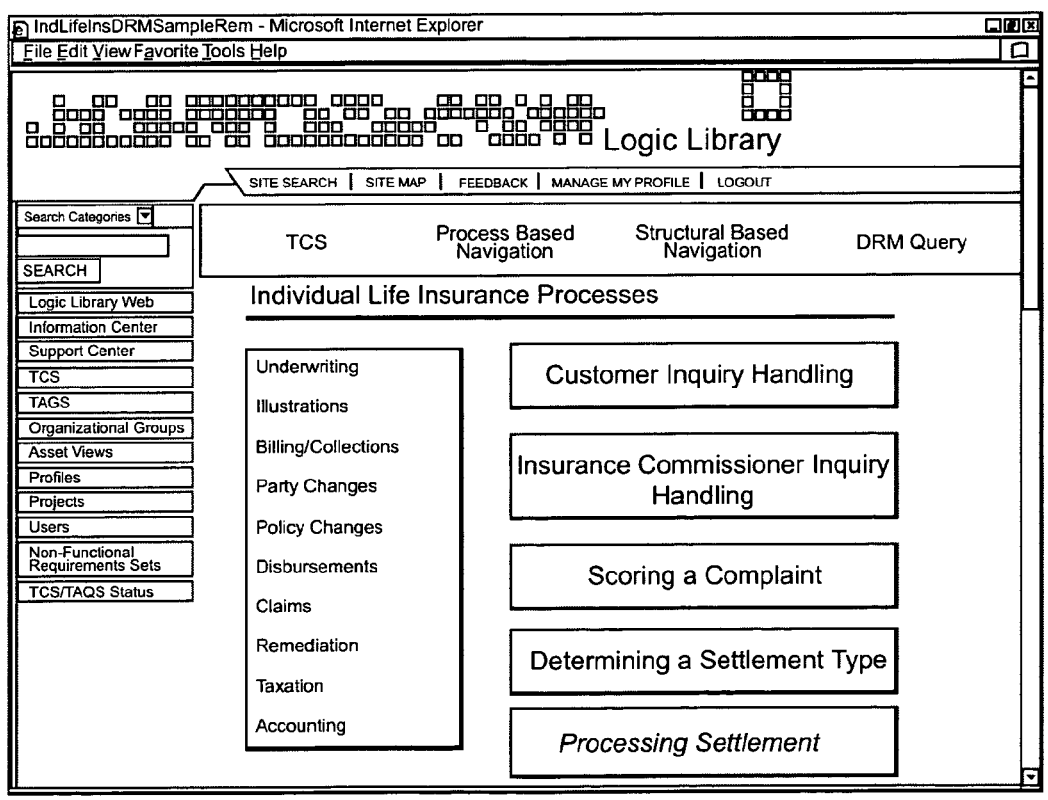
FIG. 1 is a top-level diagram of an insurance domain reference model (DRM)
Figure 2:
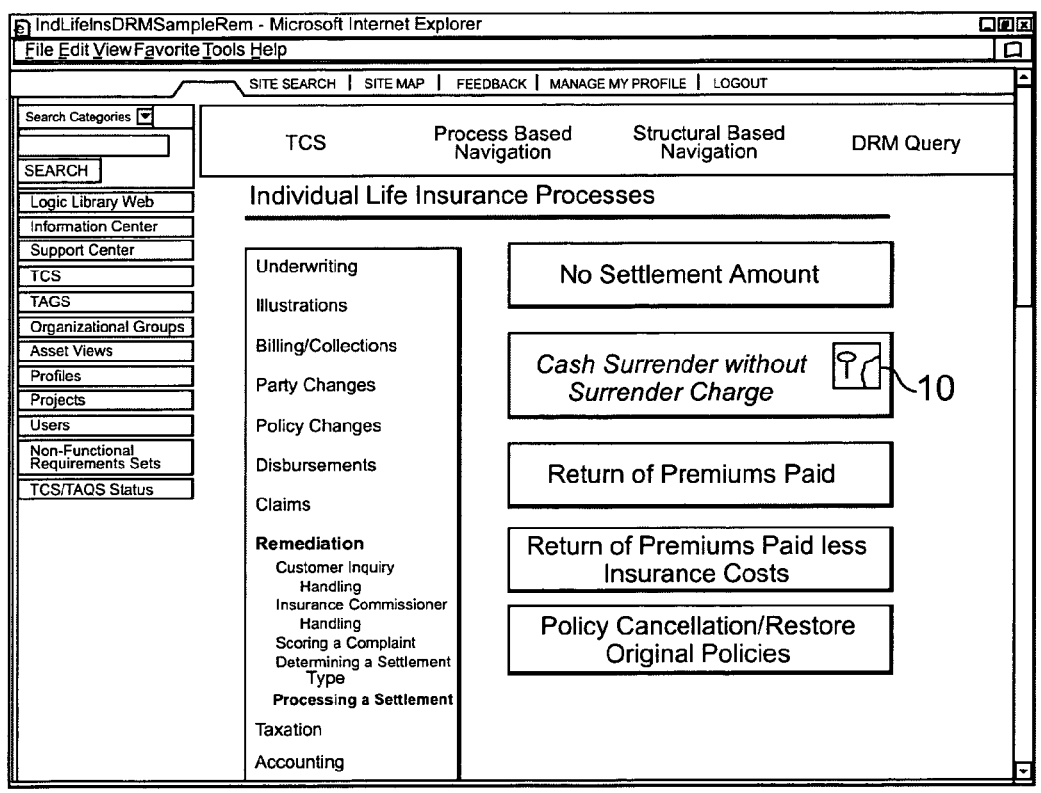
FIG. 2 is an expansion of the Remediation category of the DRM of FIG. 1.

The business-process side of a DRM for the insurance industry is shown in FIGS. 1–4. FIG. 1 shows a top-level categorization of life insurance processes, organized into the categories Underwriting, Illustrations, Billing/Collections, Party Changes, Policy Changes, Disbursements, Claims, Remediation, Taxation, and Accounting. As shown, Remediation has been selected, and subcategories of remediation processes are shown at right, including Customer Inquiry Handling, Insurance Commissioner Inquiry Handling, Scoring a Complaint, Determining a Settlement Type, and Processing Settlement. As shown in FIG. 2, if Processing Settlement is selected, additional subtopics No Settlement Amount, Cash Surrender without Surrender Charge, Return of Premiums Paid, Return of Premiums Paid Less Insurance Costs, and Policy Cancellation/Restore Original Policies. As indicated by icon 10, Cash Surrender without Surrender Charge is a lowest-level process, which has an associated set of use cases. Cross-branching may also be allowed, wherein certain subprocesses appear in more than one process.

The set of use cases represent a series of steps making up an algorithm for executing the associated subprocess. For the Cash Surrender without Surrender Charge, a portion of the associated set of use cases is shown in graphical form in FIG. 3. The use case diagram may indicate responsible personnel (settlement clerk 12) as well as individual use cases (the algorithm steps).

Figure 4:
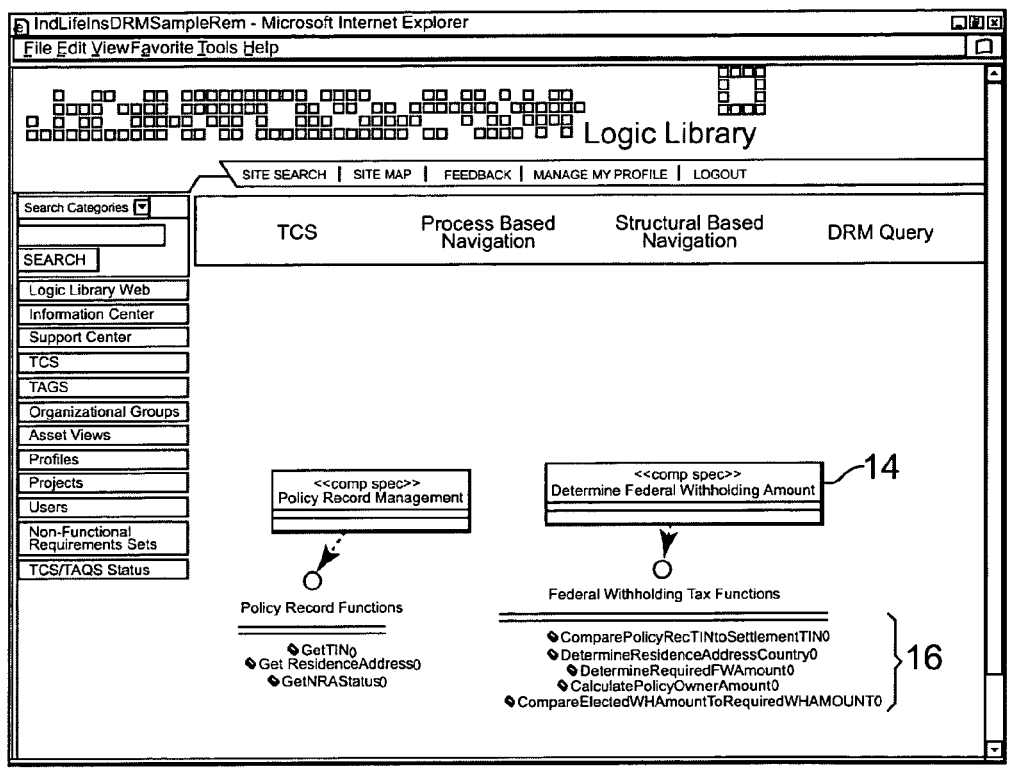
FIG. 4 shows functions identified as part of a step of the use case of FIG. 3.

FIG. 4 shows a portion of the structural form of the functions associated with the use case "Determine Federal Withholding Amount." The reference component Determine Federal Withholding Amount 14 includes five functions 16 grouped into one interface that may be performed (e.g., by subroutines) in connection with determination of federal withholding: ComparePolicyRegTINtoSettlementTIN( ), DetermineResidenceAddressCountry( ), DetermineRequiredFWAmount( ), CalculatePolicyOwnerWHAmount( ), and CompareElectedWHAmounttoRequiredWHAmount( ). In addition, three Policy Record Functions, also grouped into a single interface, are required for this use case: GetTIN( ), GetResidenceAddress( ), and GetNRAStatus( ). Some of the functions may be specific to the use case and appear only in that case (e.g., DetermineRequiredFWAmount( )), while others are generic and appear in a number of cases (e.g., GetResidenceAddress( )). In addition, expected variable types (e.g., a CurrencyValue type that includes both a decimal amount and a string currency identifier) may also be specified in the model.

Asset Capture Tool

The asset capture tool is used to catalogue resources by constructing a metadata document for placement into an asset library ("publishing" the asset). Individual data types and functions from the asset are mapped to the domain reference model (or to multiple models), and the mappings are saved as metadata for later searching to identify usable assets for new projects. In preferred embodiments of the invention, additional information may be included such as comments on the quality of the mapping, details of the asset characteristics such as language and licensing arrangements, or structural diagrams of the asset.

The asset capture process according to one embodiment of the invention is illustrated in FIGS. 5–17. The menu 40 shows the steps of the workflow process. Log 42 creates a running record of asset acquisition. The log window preferably remains throughout the asset capture process, but has been omitted from subsequent figures in order to conserve space.

Initially, the user configures the asset capture tool, setting options for the acquisition process such as the level of detail to be saved in the log, the group of DRMs to be used in the mapping process, and the schema and target repository for storing information.

Figure 5:
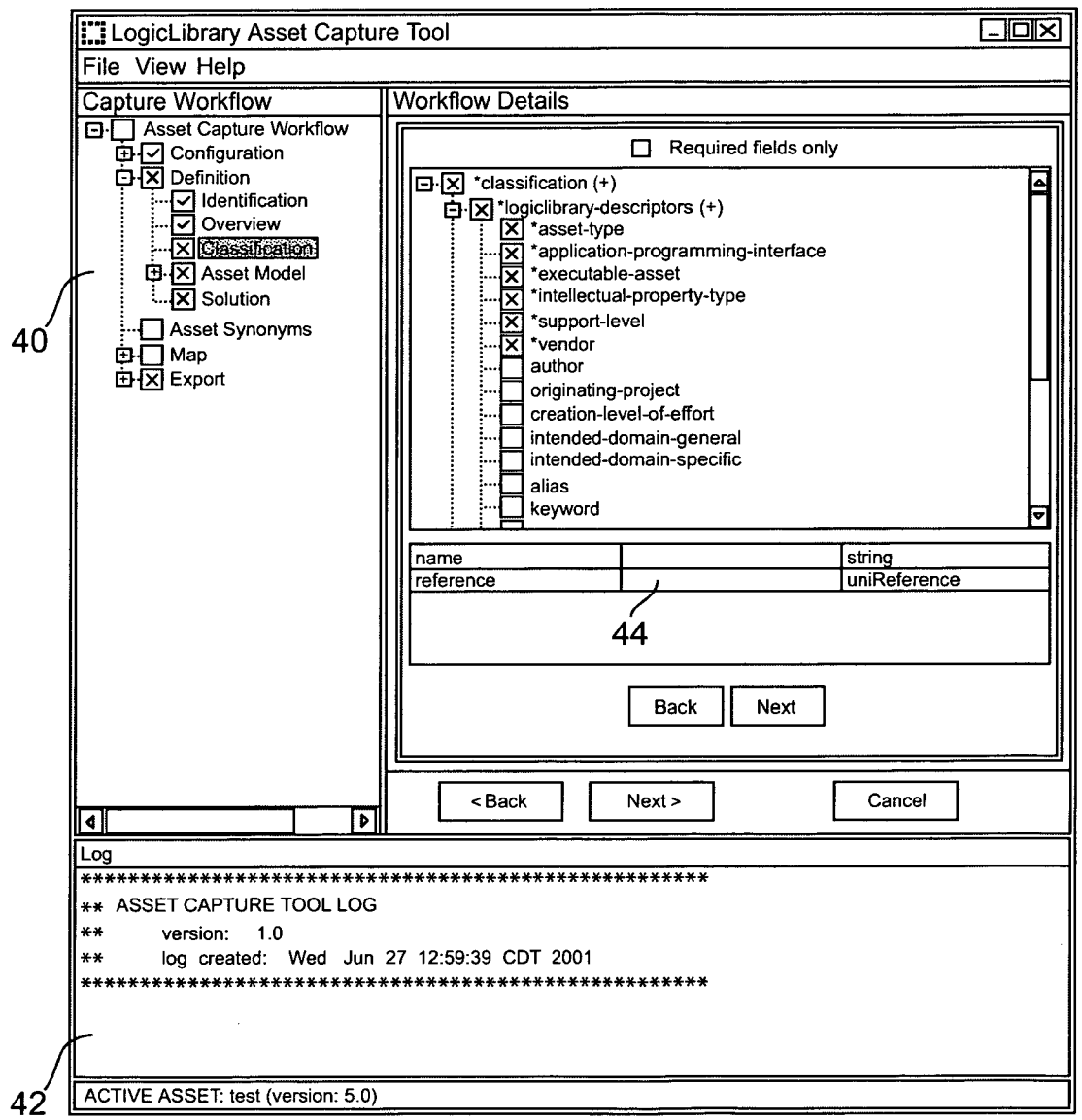
FIG. 5 is a window showing Classification according to one embodiment of the invention.

The user then proceeds to the definition stage. The asset to be added to the library is located, and general information about the asset is entered in the overview section. FIG. 5 shows the classification step. Using the data entry box 44, the user specifies values for descriptors relating to the asset as a whole. In the embodiment shown, required descriptors are marked with an asterisk; a value for these descriptors must be entered before the user can proceed with publication of the asset. The descriptors shown in FIG. 5 represent nonlimiting examples of the types of information that may be stored about the asset. A standard set of descriptors is preferably provided as part of the schema set in the configuration step, which may include any information relevant to a person deciding whether to use the asset, including descriptions of the asset itself and associated information such as licensing options. The user may also add one or more additional descriptors at this stage. These descriptors will not be added to the schema for other assets, but will be included in the metadata pertaining to the asset being added to the database.

Figure 6:
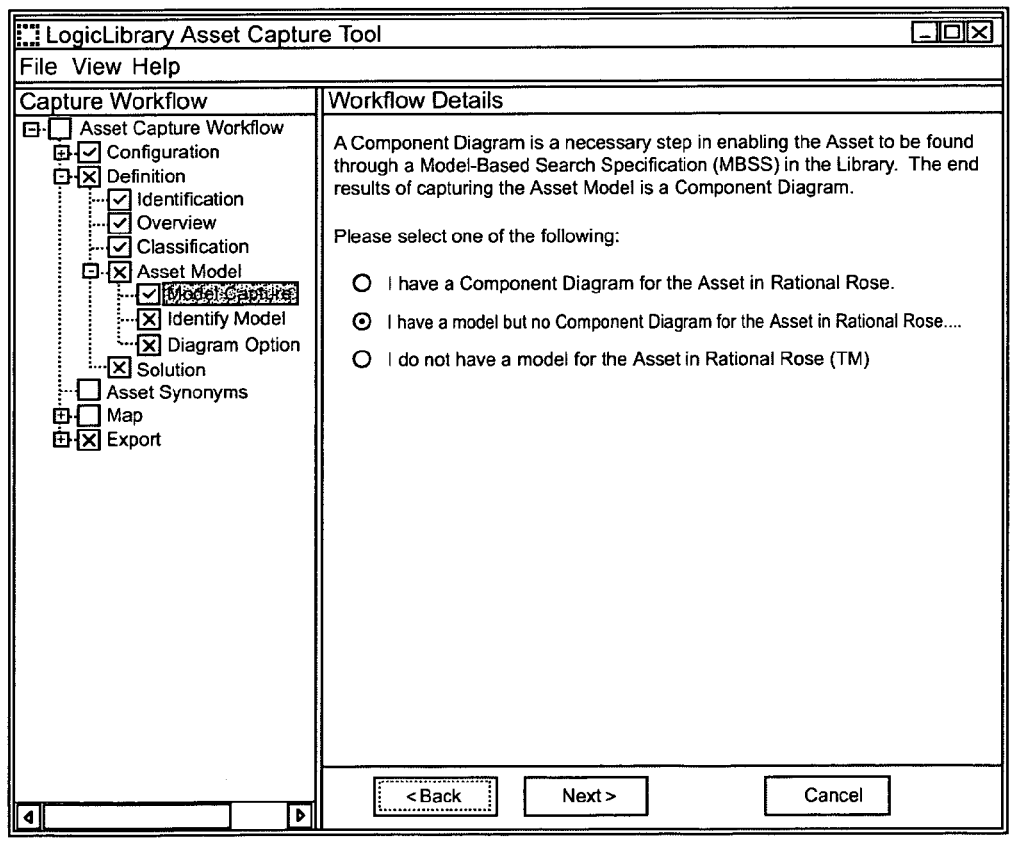
FIG. 6 is a window showing Model Capture.

Once the classification step has been completed, the user specifies the asset model and component diagram that will be used to catalogue the asset. If an asset model and/or a component diagram do not yet exist, the asset capture tool will preferably give the user the option to create them, as shown in FIG. 6.

Figure 7:
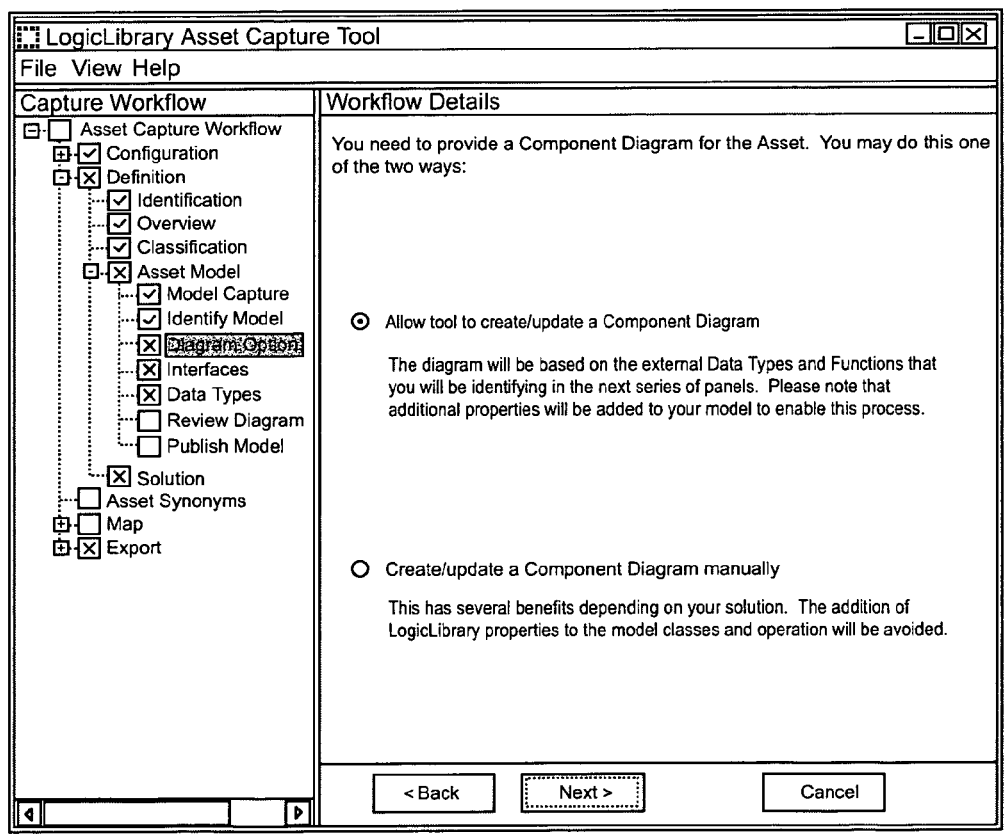
FIG. 7 is a window showing selection of Diagram options.

As part of the asset capture process, a component interface diagram will be created for the asset (unless one already exists). Preferably, the asset capture tool will be able to create or update the component diagram either automatically or manually, and will offer the user a choice of either procedure, as shown in FIG. 7. However, systems that provide only manual or only automatic means for building the component diagram also fall within the scope of the invention. The following description pertains primarily to automatic methods of generating the component diagram. However, any "manual" method that produces a component interface diagram compatible with the asset capture tool (preferably conforming to the Unified Modeling Language standard) is considered to be within the scope of the invention.

Figure 8:
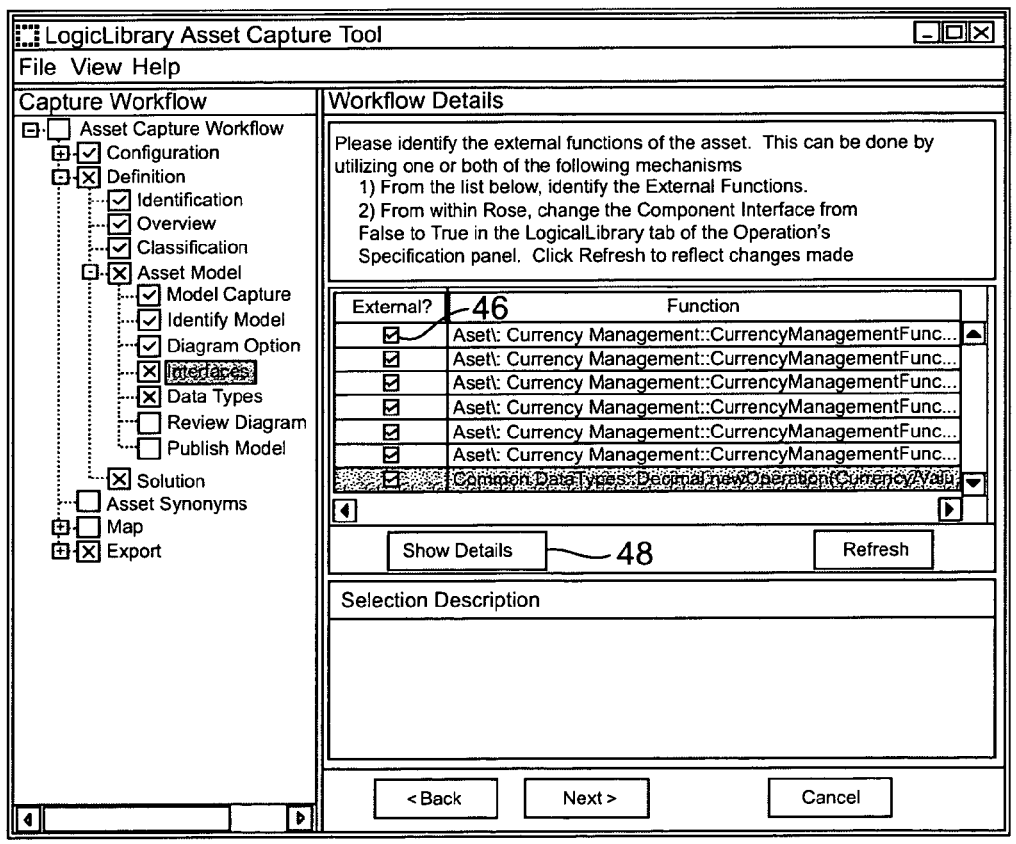
FIG. 8 is a window showing capture of an asset Interface.

To automatically generate the component interface diagram, the asset capture tool first identifies functions within the asset, and preferably allows the user to specify which functions are external, as shown in FIG. 8. The asset shown includes a collection of functions used for management of different currencies (for example, functions for determining exchange rates). Checkboxes 46 are used to identify functions that are intended to be accessible to a developer using the resource, e.g., functions and data types that are part of the API for the asset. Preferably, the user can view asset documentation for the functions, for example via a Show Details button 48.

Figure 9:
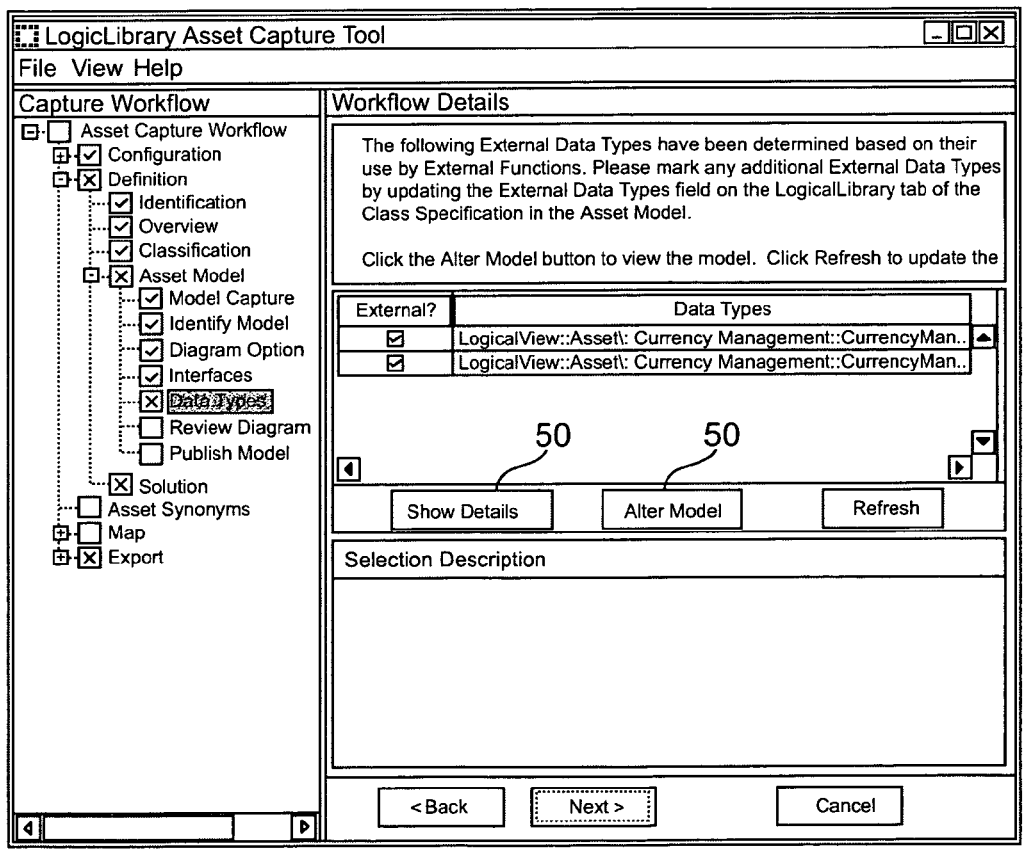
FIG. 9 is a window showing identification of external Data Types.

As shown in FIG. 9, the asset capture tool next identifies any custom data types used by the external functions of the asset, and allows the user to select any additional data types that are part of the API for the asset. (Standard "primitive" data types such as integers and Boolean variables are preferably not presented at this stage, although they are taken into account in later steps of the asset capture process). Again, details on the data types may be viewed, and the structural model may be adjusted, via buttons 50. For example, a collection of primitive data types making up a compound type may be viewed (e.g., a CurrencyValue type that includes both a decimal amount and a string identifying the currency).

Figure 10:
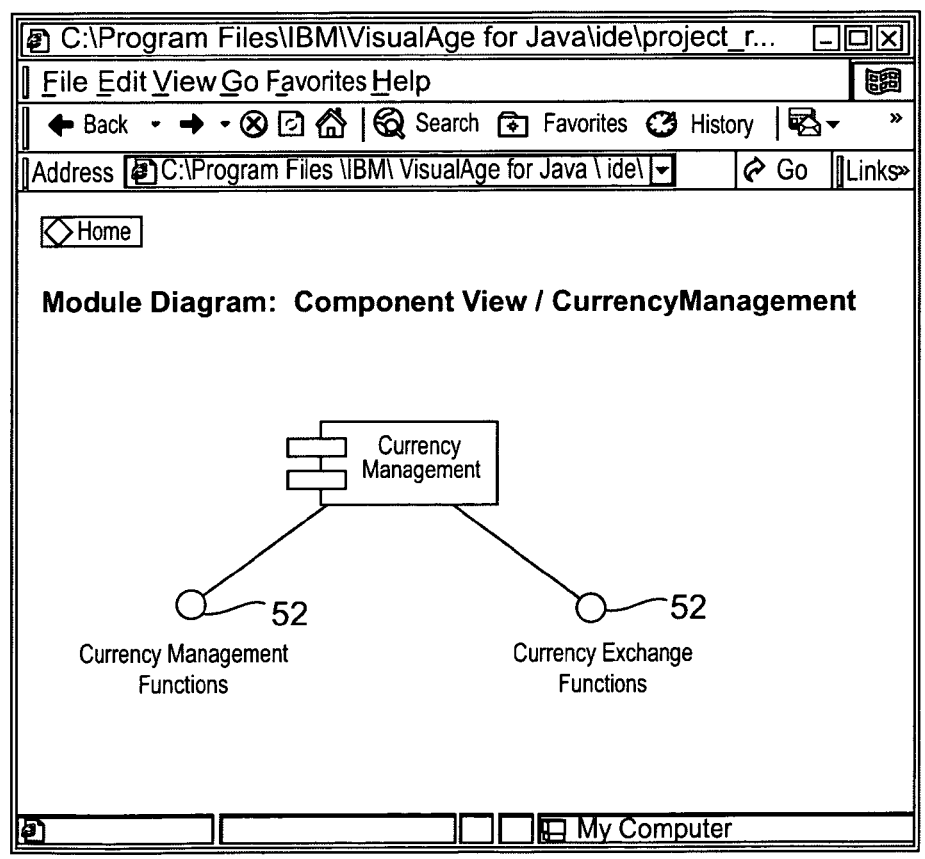
FIG. 10 is a window showing an interface diagram for a Currency Management asset.

The data on external functions and data types is used to generate an interface diagram, typically using an external tool such as Rational Rose. A generated interface diagram for the currency management asset is shown in FIG. 10. The diagram shows the selected external interfaces 52 presented by the CurrencyManagement component. Additional information about the functions may be accessed through the illustrated graphical user interface (GUI). After reviewing the diagram, the user is preferably given the option to "publish" the diagram. In one embodiment of the invention, the diagram is saved as an HTML document, which is added to the metadata for the asset. The HTML document is available to a later user who finds the asset in the database, so that he can better evaluate its suitability for the task at hand, even if he does not have Rational Rose or a similar external tool installed on his machine.

Figure 11:
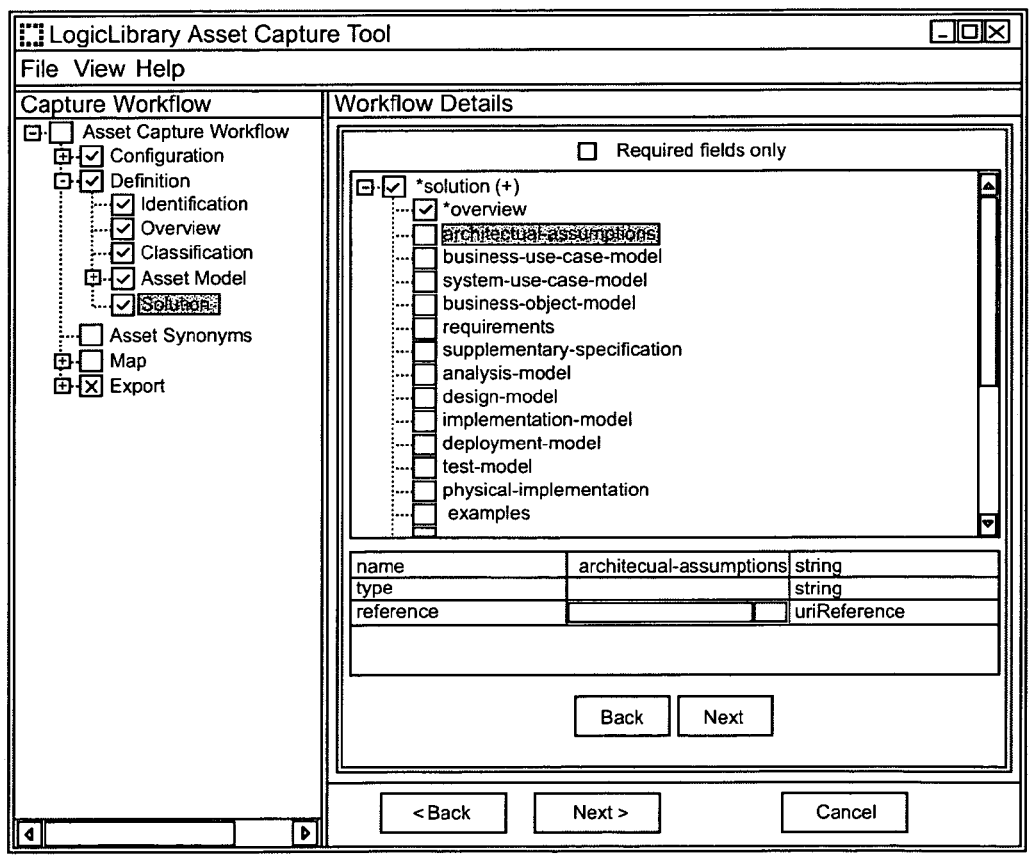
FIG. 11 is a window showing entry of artifacts for an asset.

In the final step of the asset definition phase, other descriptive elements of the asset (referred to herein as "artifacts" of the asset) such as its architectural assumptions, examples, warranty, and reviews may be specified, as shown in FIG. 11. Preferably these artifacts may be specified by value (where a copy of the artifact is made for later publication as part of the asset into the asset library), by reference (where a URL or other form of file reference is documented as part of the asset), or by description (where a text field documents the (typically physical) location of the artifact). Artifacts may include both functional and nonfunctional characteristics of the asset. Nonfunctional characteristics are distinct from the functional characteristics that are mapped against the DRM. In preferred embodiments, both nonfunctional and functional characteristics can be searched.

Figure 12:
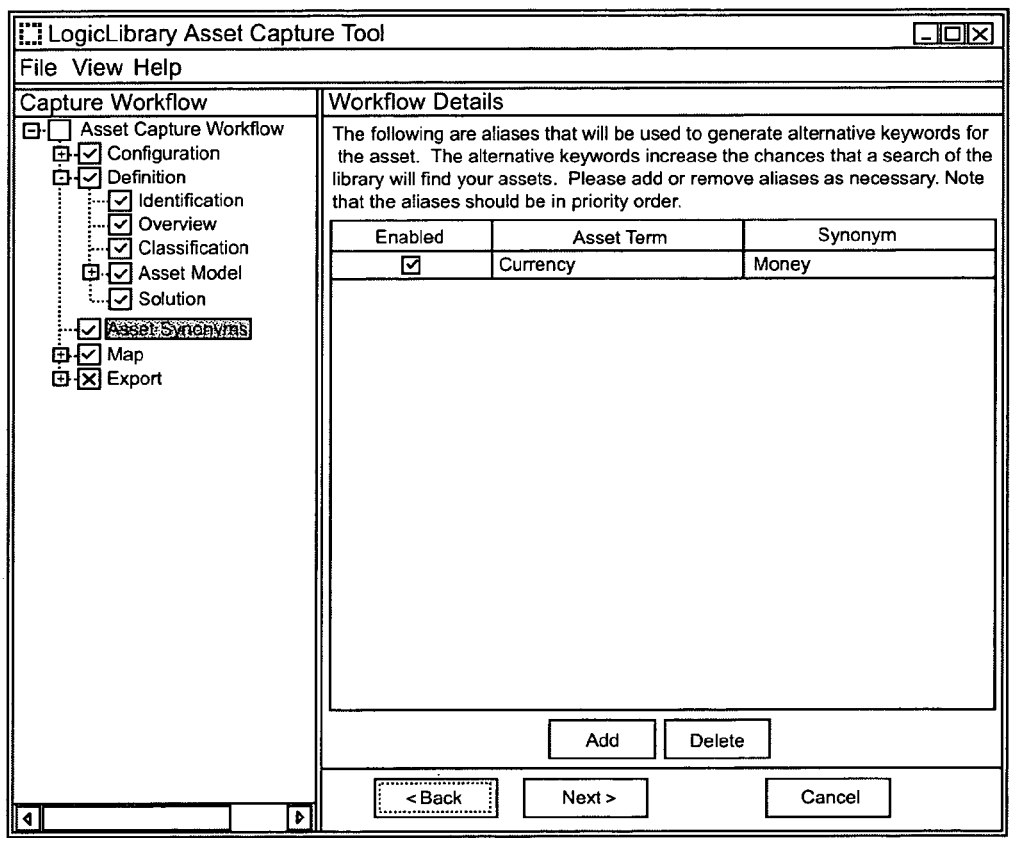
FIG. 12 is a window showing entry of Asset Synonyms.

After the asset definition phase has been completed, synonyms for the asset may be defined, as shown in FIG. 12. [I thought we grabbed a screen shot of asset synonym entry, but I don't see it—could I get one?] These synonyms are designed to improve the quality of searches by associating words used in the asset functions and descriptions with likely synonymous search words. For example, if an asset routinely uses "schedule" internally to refer to a collection of insurance rates, it may be desirable to associate "schedule" with "rates" to improve the probability of appropriate functions being displayed during a search for functions handling insurance rates. As will be described in more detail in connection with searches, one system according to the invention uses substring substitution of synonyms to improve search quality. More complicated semantic analysis in view of defined synonyms may also be used and falls within the scope of the invention.

Figure 13:
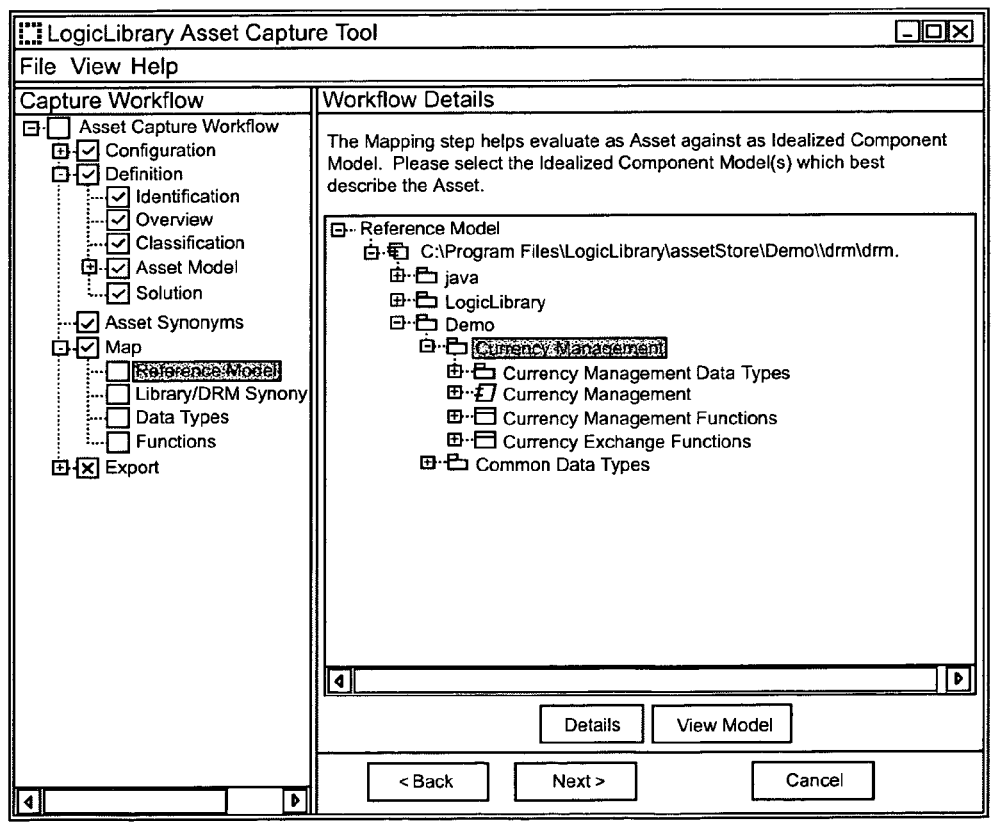
FIG. 13 is a window showing selection of a Reference Model.

After definition of asset-specific synonyms, the user maps the asset to one or more DRMs contained within the group of models selected during the configuration step. The reference model is selected, as shown in FIG. 13. In the embodiment shown, only one reference model may be selected, but multiple portions of that model may be run simultaneously. In other embodiments, multiple DRMs may be selected to run either simultaneously or sequentially. In FIG. 13, the Currency Management model includes both management functions and exchange functions. If the user knows that only management functions are performed by the asset, he may select only that portion of the model for mapping. If both management and exchange functions are performed, or if the user is not certain of the full scope of functions performed, all parts of the model may be used.

Figure 14:
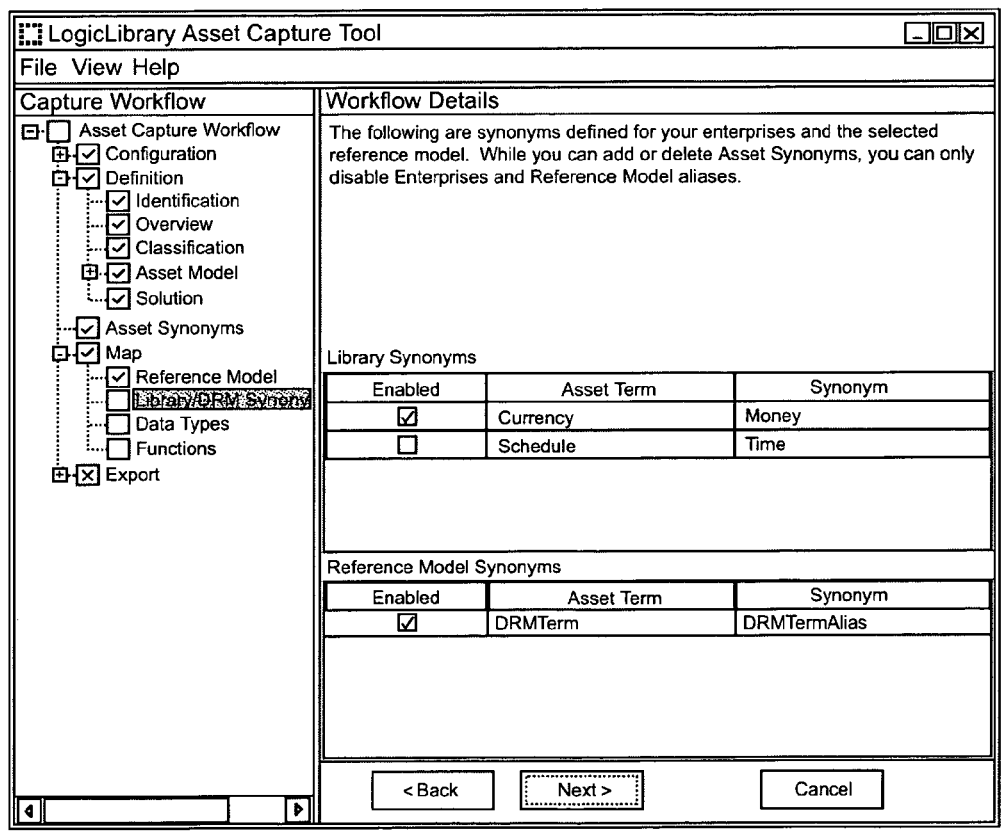
FIG. 14 is a window showing Synonyms for the DRM and Library.

The user may view synonyms that have been defined for the DRM or on an enterprise-wide basis, as shown in FIG. 14. In the embodiment shown, the user cannot add synonyms to the DRM or to the library as a whole, but has the option to enable or disable certain synonyms. This feature is particularly useful for words that may have multiple meanings. For example, "money" is enabled as a synonym for "currency." However, if the user knows that the asset uses the term "schedule" to mean a collection of insurance rates, he may wish to disable the synonym of "time" for "schedule."

Once the reference model and synonyms have been selected, the asset can be mapped against the DRM. In preferred embodiments, the mapping begins with data types and proceeds through functions, working from the least to the most complex. By using information from earlier mappings, the quality of automatic suggestions for mapping can be improved.

Figure 15:
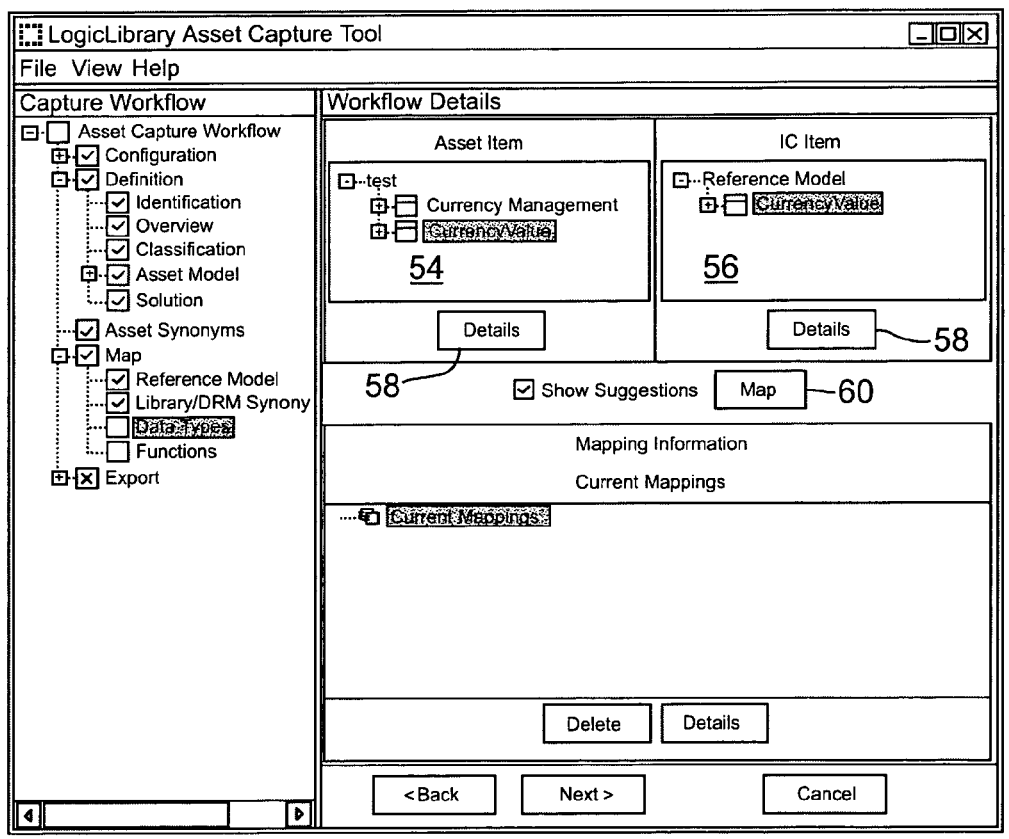
FIG. 15 is a window showing Datatype mapping.

FIG. 15 shows the first step in mapping data types. The custom data type CurrencyValue exists in the asset, as shown in left panel 54. When CurrencyValue is selected, the reference model is searched, using substring substitution for known synonyms, and one or more suggested model datatypes are displayed in right panel 56. In order to select the best match, details for either the asset datatype or the model datatype can be accessed via the Details buttons 58.

Figure 16:
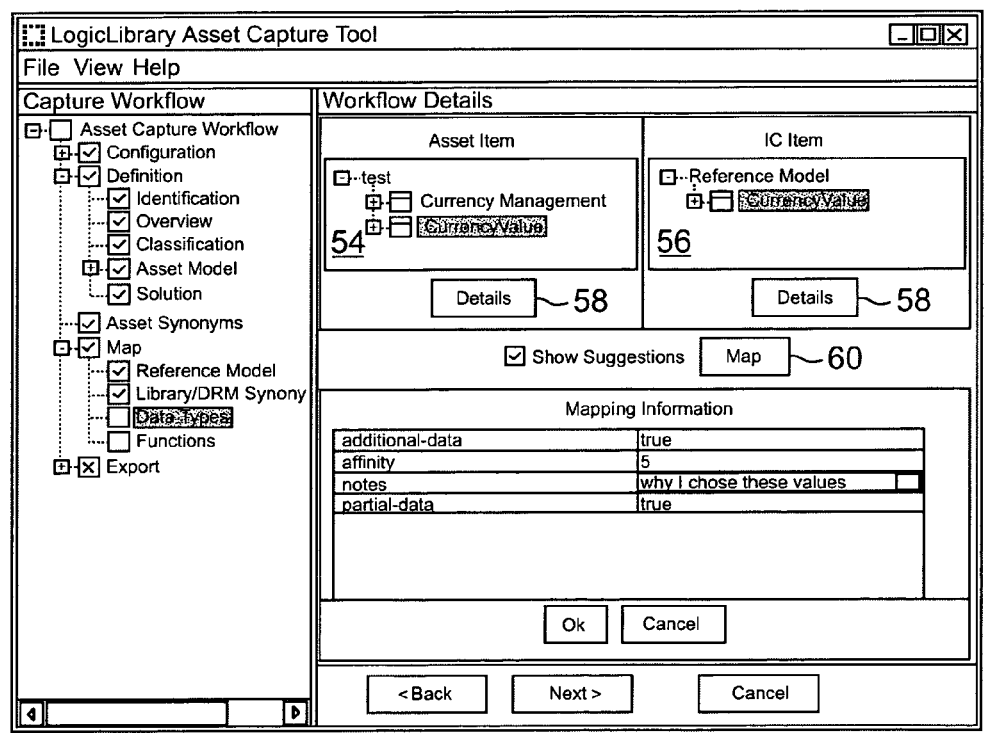
FIG. 16 is a window showing entry of descriptors of mapping quality.
Figure 17:
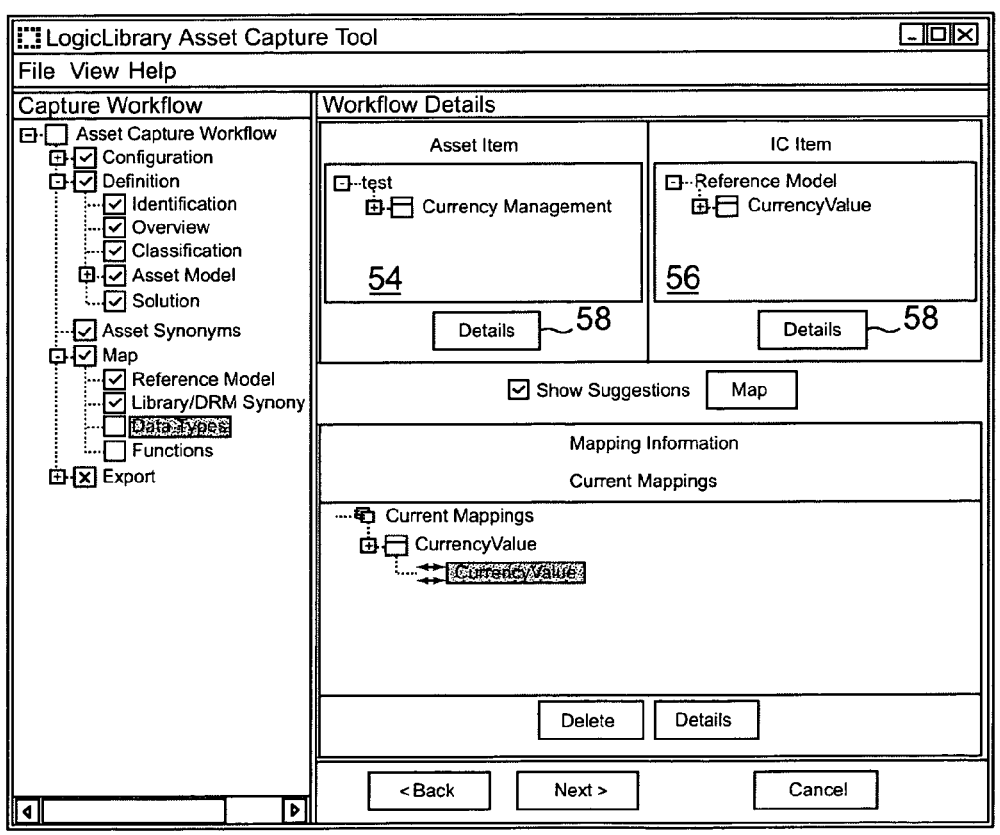
FIG. 17 is a window showing a completed Datatype mapping.

FIG. 16 shows the system after a suggested datatype has been selected. Four descriptors have been provided to describe the quality of the mapping. Boolean types additional-data and partial-data allow the user to specify whether the asset datatype contains more or less information than the model datatype. In addition, the quality of the matching can be stored in the affinity field, and a notes field allows the user to describe any special characteristics of the mapping. Once the user has entered values for these descriptors and clicks the Map button 60, the mapping for CurrencyValue is added to the metadata for the asset, as shown in FIG. 17. This mapping is then used to refine the quality of suggested mappings for later (generally more complex) datatypes and for functions.

The mapping process for functions proceeds in the same fashion as the mapping process for custom datatypes. The user has available the same set of descriptors for describing the quality of the mapping between available external functions that were available for mapping datatypes. By mapping datatypes first, the asset capture tool can use datatype equivalencies to select likely candidates for functional equivalencies. For example, a function called Convert( ) that takes CurrencyValue as an argument may be a more likely match in a currency exchange package than one that takes GregorianDate. Functions, like datatypes, may be mapped in a many-to-many relation, and the additional-data, partial-data, and comments fields can be used to annotate the quality and characteristics of the mapping(s).

Once all functions and datatypes have been mapped to the DRM to create the component diagram, the accumulated metadata for the asset can be uploaded to the database for searching. Any of a number of standard file formats may be used for database entries.

Model Based Search Specification

Once assets have been classified in a library database, a search engine should be provided to allow them to be accessed. While standard search engines may be used on the database described above, it is preferable to use a specialized engine designed to take maximum advantage of the unique data stored in the library.

According to one embodiment of the invention, the search engine is designed to allow construction of a search specification using either the process-based side or the structural side of a domain reference model as described above. FIGS. 1–4 and 18-22 show the process of constructing a search specification, performing a search, and interpreting the results.

Figure 3:
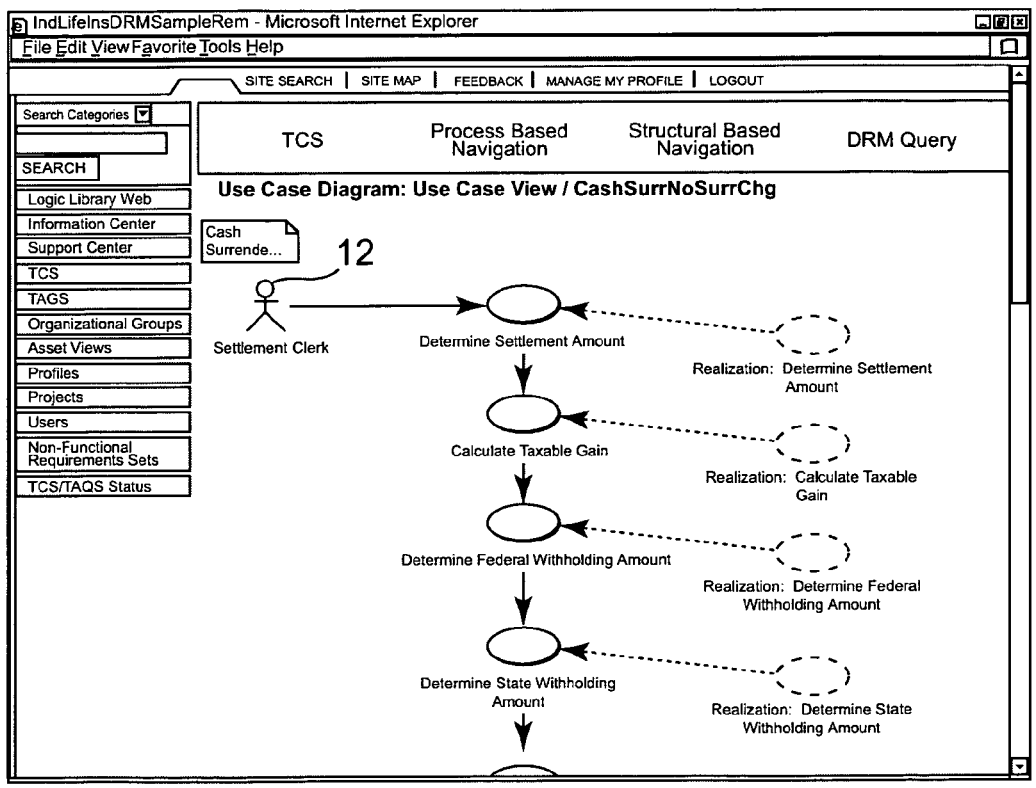
FIG. 3 shows a portion of a use case diagram from the insurance DRM.

A user unfamiliar with software development can nevertheless identify assets useful for creating a tool to solve a particular need, by navigating the business process-based side of the domain reference model shown in FIGS. 1-4. Proceeding through FIGS. 1 and 2 as described above, the user selects functions from within the DRM until he reaches a use case diagram. The use cases making up the diagram can be viewed as shown in FIG. 3. For any use case within the diagram, the user may view associated functions from the structural portion of the DRM, as shown in FIG. 4. The user then selects the desired functions from the list for addition to the search specification. Preferably, the user may be given the option to automatically select all of the functions associated with the use case, or selected blocks of functions associated with individual use case steps. The graphical user interface and drill-down through the process side of the DRM makes it easy for the user to identify all of the needed functionality, even if he is unfamiliar with the conventional process of developing technical specifications. In a preferred embodiment of the invention, the library database also provides a DRM search facility that allows users to selectively enter a DRM at any point based on query results (e.g., a keyword search for DRM elements associated with the term "currency" and preferably its synonyms), thus allowing the user to rapidly find model elements of interest.

A search specification constructed in this manner is shown in FIG. 18. Two functions 80 have been identified from the candidates shown in FIG. 4: GetNRAStatus from the PolicyRecordManagement functions, and addExchangeRate from the CurrencyManagement functions. In addition, the user can specify general parameters 82 and function-specific parameters 84 for how close a match is required.

Figure 19:
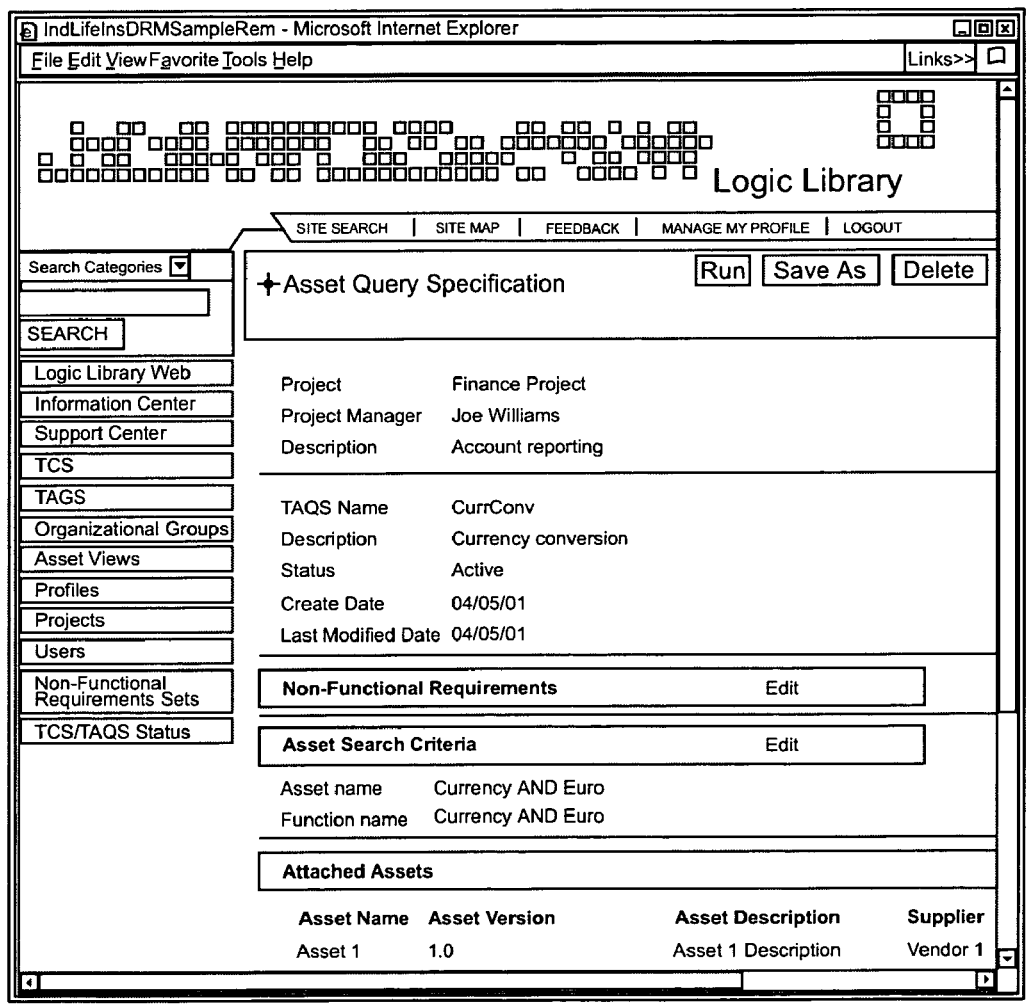
FIG. 19 is a window showing a constructed search specification using keywords.

Keyword searches may also be available through the search engine, as shown in FIG. 19. Particularly in these searches, the search engine preferably makes use of the asset-specific, DRM-specific and enterprise-wide synonyms that were defined during initial library configuration and during asset capture. Thus, when a user searches for "currency," the system returns both assets with functions and datatypes involving "currency" and functions and datatypes involving "money."

In either type of search, the user preferably may specify nonfunctional requirements such as operating system, license type, or language. These requirements may preferably be given weights in the same manner that individual functions can be weighted.

Figure 20:
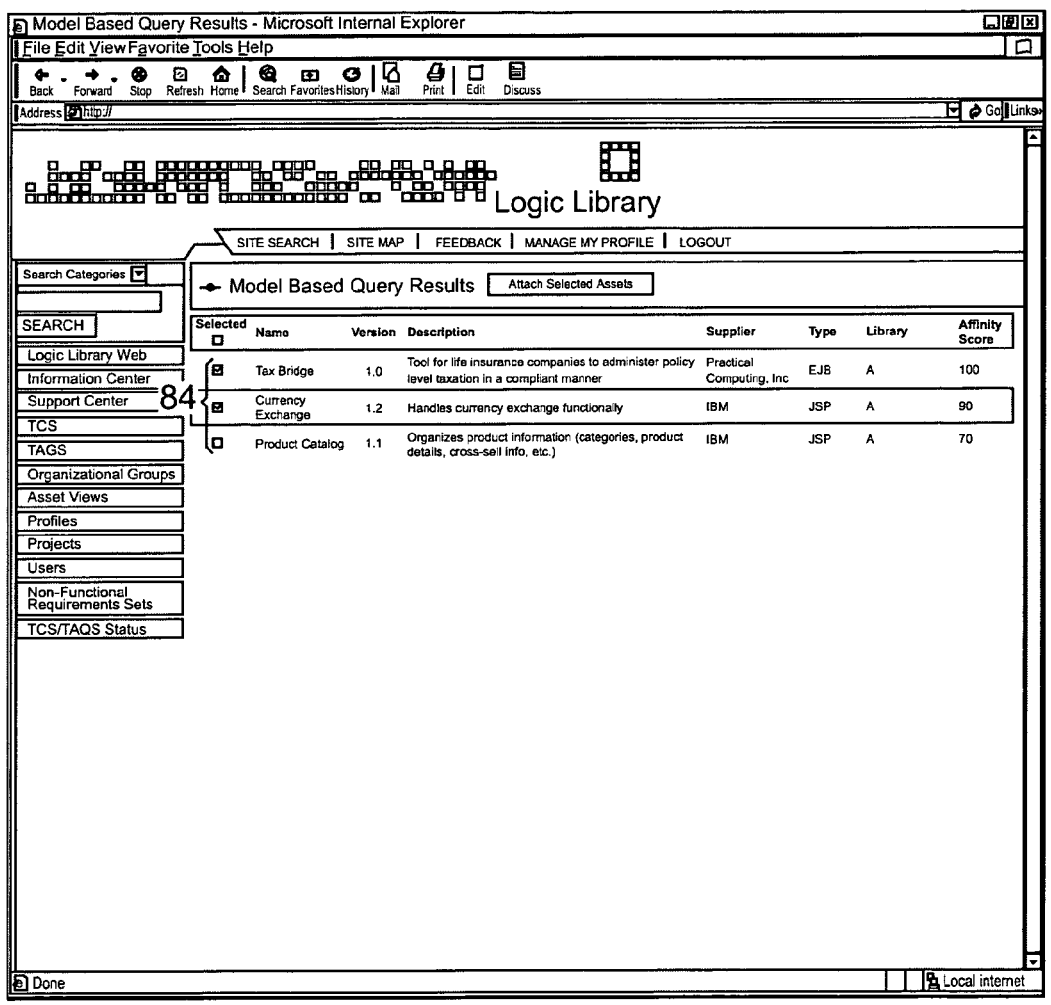
FIG. 20 is a window showing a search result.

A result for the search specification shown in FIG. 18 is shown in FIG. 20. Three potentially useful assets have been identified; they are ranked according to how closely they fit the search criteria. The user may select some or all of the assets returned for further investigation via checkboxes 84. The selected assets are then attached to the search specification, as shown in FIG. 21. The search engine preferably learns by observing which assets are attached, in order to refine its scoring algorithm for later searches; those resources that were attached to the search specification will be preferentially returned in subsequent similar searches.

Figure 22:
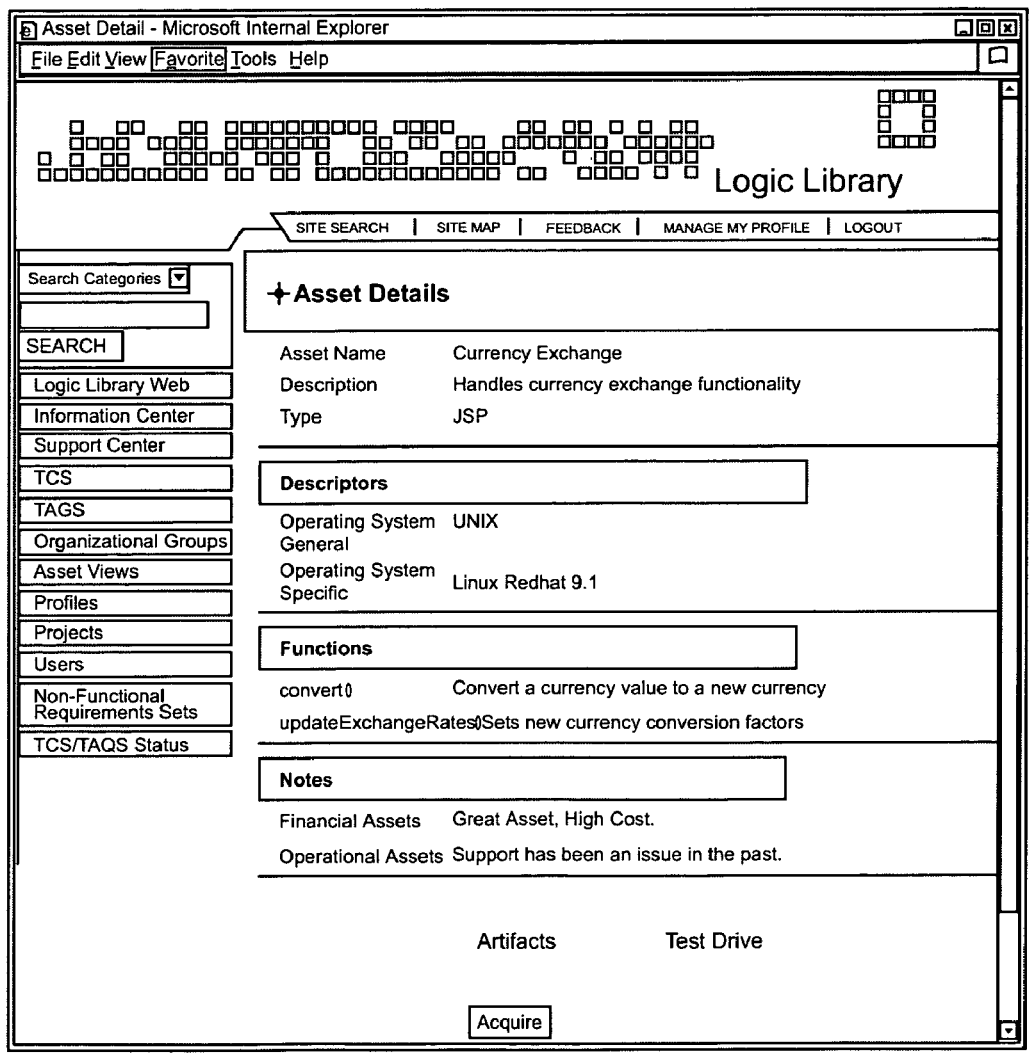
FIG. 22 is a window showing a detailed view of an attached asset.

Before or after the assets have been attached to the search specification, the user can investigate them in more detail, as shown in FIG. 22. The Asset Details window allows the user to view any of the descriptors that were entered during the asset capture process, such as reviews of the asset and support issues. The user can use the detailed data to select the assets he wishes to acquire.

One feature of the invention is that a user who is familiar with business processes, but not with construction of formal technical specifications, can build a search specification and attach useful assets to it. The search specification can be used by others who are less familiar with the business process, but who are familiar with software development, to identify assets that can be readily used together. By allowing such collaboration, the invention provides more effective leveraging of software assets within an enterprise.

In the event that a search specification results in no potentially useful assets being found, the user preferably may specify that the specification be published as an initial requirements document for new asset development. If a partial match is found, the user preferably may similarly publish the unmatched portion of the specification as a requirements document. The user may also choose to mark a search specification such that the user will be informed in the event that any asset subsequently published into the library sufficiently conforms to the specification.

Asset Management

Figure 23:
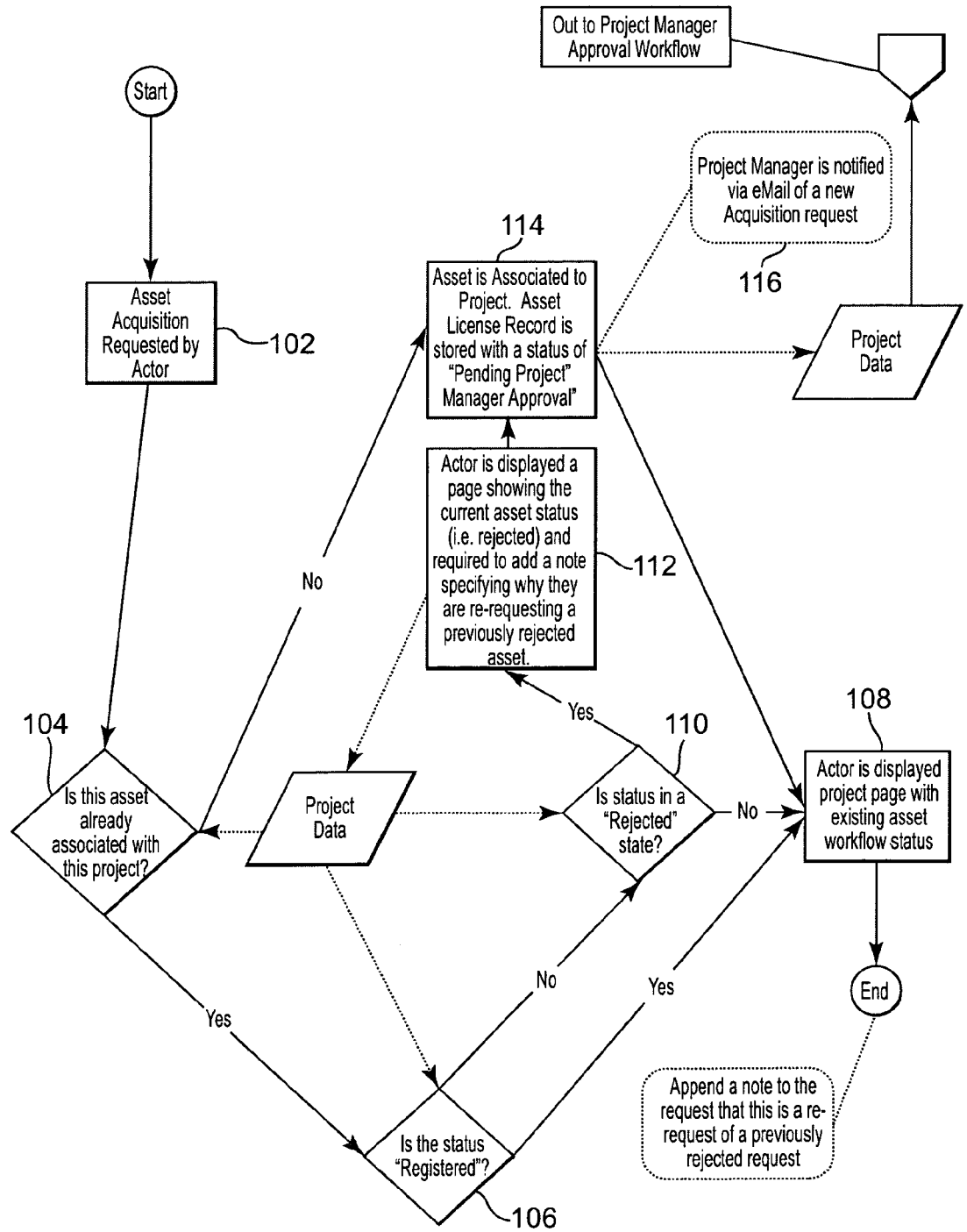
FIG. 23 is a flow chart showing the process for submitting an asset for acquisition.

In preferred embodiments of the invention, the system also facilitates the software asset acquisition process. An acquisition workflow is shown in FIG. 23. Once an appropriate asset or assets have been identified using the search specification, the user may submit an acquisition request 102. Acquisition requests are associated with individual development projects.

The system first determines whether the asset is associated with the project 104. If it is, the system checks to see if the asset is registered 106. If the asset is both associated with the project and registered, then it is already available for use in development and its status is displayed to the user 108. If the asset is associated with the project and not registered, it may be that it is already under consideration by the Project Manager, or that it has previously been rejected. If the system determines that the asset has not been rejected 110, it displays the asset's "pending" status to the user 108. If the asset has previously been rejected, then the user is required either to give a reason for requesting reconsideration of the rejection 112 or to cancel the request.

If the asset is not already associated with the project, or if the user is requesting reconsideration of a rejection, the asset status is set to "pending project manager approval," 114 and the Project Manager is notified 116 of the new acquisition request.

Figure 24:
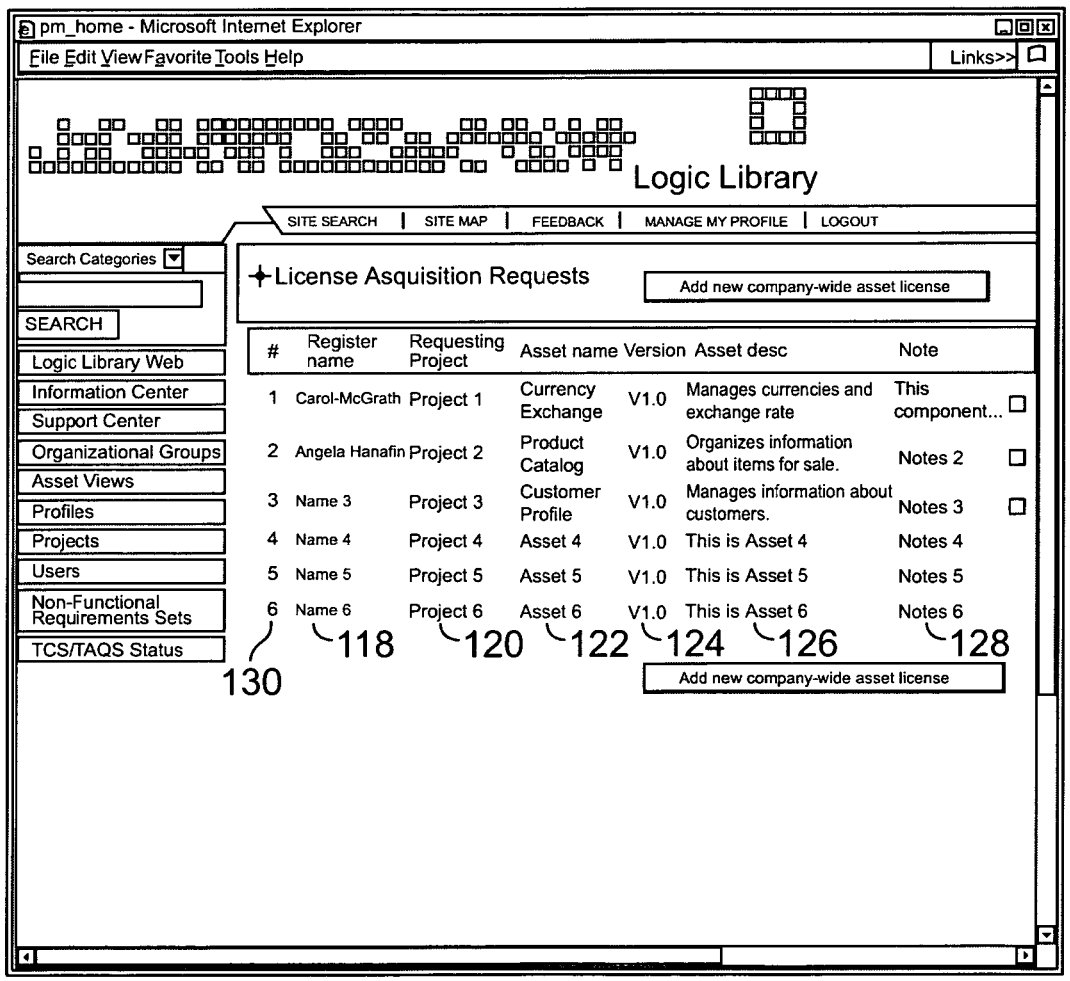
FIG. 24 is a window showing pending acquisition requests.

A summary of asset acquisition requests according to one embodiment of the invention is shown in FIG. 24. Depending on the needs of the individual system, this view may be available only to Project Managers and other designated users, to all users for a particular project, or to all users in the system.

Each pending request is preferably listed by requester 118, project 120, and name 122. Additional information may also be included such as version numbers 124, descriptions 126, and notes 128. By selecting links 130, the manager may view the details of any request.

FIG. 25 shows a typical request detail screen for an asset, viewable at least by a Project Manager for a project that has requested the asset. Preferably, all requests for the assets are shown on a single screen, with the reasons for the requests listed by the requesters. If the user viewing the request screen is empowered to acquire software, he may enter license and purchase data via an asset acquisition screen as shown in FIG. 26. (Users empowered to acquire software may also be able to directly access the asset acquisition screen from a search result or by identifying the asset to be acquired manually).

In some embodiments of the invention, the acquisition screen may allow the user to send a purchase order, a request for internally developed assets, or otherwise formally acquire the asset. Alternatively, the acquisition screen may simply memorialize the acquisition of the resource by other channels, as in the screen shown in FIG. 26. In that screen, the acquirer may record any software license keys, describe the location of hardware keys, and make any necessary notes on the conditions of the software purchase. If the license is for a certain number of instantiations or workstations, there may also be provided a mechanism for assigning instantiations or workstations to projects to avoid violating the terms of the license. For internally developed or acquired assets, there may be departmental cross-charges for use of the asset; these may also be tracked in preferred embodiments of the invention.

The system preferably also includes means for tracking the usage of individual assets by different projects. In preferred embodiments, this information may either be viewed directly by the library in the form of prebuilt reports or exported for further processing. As an example of a prebuilt report, FIG. 27 shows a summary of published and unpublished assets created by a particular user or department. For published assets, links 134 allow the publisher or another user to review the projects currently registered to use the asset. For users with the appropriate permissions, departmental cross-charges and the like may be modified.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A software utility for interacting with a user to classify a software resource according to a predetermined domain model, the utility comprising:

data type mapping means that allow the user to map data types to the domain model;

function mapping means that allow the user to map software resource functions to the domain model, wherein the functions and data types are provided by an application programming interface (API) of the software resource being classified;

identification means that allow the user to specify the location of the software resource;

a database comprising data type maps, resource function maps, and location information specified by the user; and search means for searching the database for identifying the software resource as containing software usable by a software developer.

2. The software utility of claim 1, wherein the domain model comprises:

a process model comprising processes and use cases;

a structural model comprising reference components, reference interfaces, and reference functions.

3. The software utility of claim 2, wherein portions of the process model are linked to reference components, reference interfaces, or reference functions of the structural model.

4. The software utility of claim 3, wherein the domain model comprises a plurality of process models, poitions of each process model linked to reference components, reference interfaces, or reference functions of the structural model.

5. The software utility of claim 2, wherein the data type mapping means allow the user to map data types to the structural model.

6. The software utility of claim 2, wherein the function mapping means allow the user to map functions to the structural model.

7. The software utility of claim 1, wherein the data type mapping means or the function mapping means use synonyms to suggest mapping candidates.

8. The software utility of claim 1, wherein the data type mapping means or the function mapping means comprise means for the user to provide comments, the comments being stored in the database.

9. The software utility of claim 8, wherein the comments are associated with a particular data type or resource function and include infonnation relating to quality of mapping.

10. The software utility of claim 8, wherein the comments are associated with a particular data type or resource function and include infonnation relating to the purposes or usage of individual functions or data types.

11. A software utility for managing software resources within an enterprise, comprising:

a database comprising software resource information including location information and functionality information, the functionality information including functions provided by programming interfaces of the software resources being mapped to a domain model; and a search engine for searching the database to locate software resources usable by a software developer for a software development project.

12. The software utility of claim 11 wherein the search engine searches the database to locate software resources meeting functional or nonfunctional requirements.

13. The software utility of claim 12, wherein the search engine comprises a scoring engine that ranks software resources according to how closely they match the fimctional or nonfunctional requirements.

14. The software utility of claim 12, wherein the search engine comprises means for creating a persistent search specification that can be shared between multiple users.

15. The software utility of claim 14, wherein software resources located by the search engine may be selectively attached to the persistent search specification.

16. The software utility of claim 15, wherein portions of the persistent search specification not met by attached assets may be published as requirements for development of additional software resources.

17. The software utility of claim 14, further comprising means fur notifying at least one of the multiple users when software resources matching the persistent search specification are added to the database.

18. The software utility of claim 14, further comprising means for publishing the persistent search specification as requirements for development of additional software resources.

19. The software utility of claim 18, further comprising means for notifying at least one of the multiple users when software resources matching the persistent search specification are added to the database.

20. The software utility of claim 11, wherein the functionality information is mapped to a plurality of domain models.

21. The software utility of claim 11, further comprising means for viewing the domain model in order to specify requirements for searching the database.

22. The software utility ofclaim 21, wherein the viewing means comprise a graphical user interface.

23. The software utility of claim 22, wherein the domain model comprises a process model and a structural model, and wherein the graphical user interface comprises means for navigating between the process model and the structural model.

24. The software utility of claim 22, wherein elements of the domain model may be directly accessed by keyword search.

25. The software utility of claim 11, wherein the database further comprises a usage record for the software resource.

26. The software utility of claim 25, wherein the usage record is associated with a development project.

27. The software utility of claim 25, wherein the usage record comprises one or more items selected from the group consisting of payment records, license keys, request histories, and usage histories.

28. The software utility of claim 25, further comprising means for generating usage reports for the software resource.

29. The software utility of claim 25, further comprising means for one or managers to approve requests for resource acquisition.

30. A method of classifying a software resource comprising functions and data types, the method comprising:

providing a domain model comprising model functions and mode data types;

mapping resource data types to model data types to produce data type maps;

mapping resource functions to model functions to produce function maps; and storing the data type maps and function maps in a searchable database, wherein the functions and data types are provided by a programming interface of the software resource, and wherein the software resource contains software usable within a software development.

31. The method of claim 30, wherein the domain model comprises:

a process model comprising processes and use cases; and a structural model comprising reference components, reference interfaces, and reference functions.

32. The method of claim 31, wherein portions of the process model are linked to reference components, reference interfaces, or reference functions of the structural model.

33. The method of claim 32, wherein the domain model comprises a plurality of process models, portions of each process model linked to reference components, reference interfhces, or reference fimctions of the structural model.

34. The method of claim 30, further comprising providing suggestions of possible model functions or model data types for mapping to resource functions or resource data types.

35. The method of claim 34, wherein providing suggestions includes using synonyms to search model function descriptions and model data type descriptions.

36. The method of claim 30, further comprising storing comments relating to the software resource in the database.

37. The method of claim 36, wherein the comments relate to the quality of mapping of the function maps or the data type maps.

38. The method of claim 36, wherein the comments include information relating to the purposes or usage of individual resource functions or resource data types.

39. A method of managing software resources within an enterprise, comprising:

maintaining a searchable database of software resource information including location information and fimctionality information, the functionality information includinR functions provided by proaramming interfaces of the software resources that are being mapped to a domain model; and searching the database to locate any of the software resources fur a software development project based on the data types and functions of the prgramming interface.

40. The method of claim 39, further comprising searching the database using a search engine that ranks software resources according to how closely they match functional or nonfunctional requirements.

41. The method of claim 39, further comprising creating a persistent search specification for the database that can be shared between multiple users.

42. The method of claim 41, further comprising attaching at least one software resource to the persistent search specification.

43. The method of claim 42, further comprising publishing the portions of the search specification not met by any attached resource as requirements for development of additional software resources.

44. The method of claim 41, further comprising notifying a user when a resource is added to the database that matches the persistent search specification.

45. The method of claim 41, further comprising publishing the persistent search specification as requirements for development of additional resources.

46. The method of claim 39, further comprising accepting requests for acquisition of software resources and forwarding the requests to an acquirer.

47. The method of claim 46, further comprising storing acquisition information provided by the acquirer.

48. The method of claim 47, further comprising generating a report of resource acquisition or resource usage.

49. The method of claim 46, further comprising generating a report of requests for the software resources.

50. A method of mapping a software resource to a domain resource model comprising model functions and model data types, the method comprising:

determining resource functions and resource data types to be mapped, determining an order for mapping resource functions and resource data types, wherein more complex functions and data types are mapped later than simpler functions and data types;

presenting the resource functions and data types in the determined order to a user for mapping; and presenting suggested mappings for each function and data type to the user for determination of a mapping, wherein determined mappings for earlier resource functions or data types are used to suggest mappings for later types.

51. The method of claim 50, wherein all data types are ordered before functions.

52. The method of claim 50, wherein the user may elect to map functions and data types in an order other than the presented order.

* * * * *

UNITED STATES PATENT AND TRADEMARK OFFICE
CERTIFICATE OF CORRECTION

PATENT NO.        : 7,080,355 B2                                    Page 1 of 1
APPLICATION NO. : 09/900101
DATED             : July 18, 2006
INVENTOR(S)       : Brent Carlson et al.

It is certified that error appears in the above-identified patent and that said Letters Patent is hereby corrected as shown below:

Col. 11, Line 36, "poitions" should read --portions--.

Col. 11, Line 59, "infonnation" should read --information--.

Col. 13, Line 22, "interfhces" should read --interfaces--.

Col. 13, Line 22, "fimctions" should read --functions--.

Col. 13, Line 40, "fimctionality" should read --functionality--.

Col. 13, Line 42, "includinR" should read --including--.

Col. 13, Line 42, "proaramming" should read --programming--.

Col. 13, Line 46, "fur" should read --for--.

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,080,355 B2 | Page 1 of 1 |
| APPLICATION NO. | : 09/900101 | |
| DATED | : July 18, 2006 | |
| INVENTOR(S) | : Brent A. Carlson et al. | |

It is certified that error appears in the above-identified patent and that said Letters Patent is hereby corrected as shown below:

On Column 7, line 5 delete "[I thought we grabbed a screen shot of asset synonym entry, but I don't see it—could I get one?]"

Signed and Sealed this

Fourth Day of September, 2007

JON W. DUDAS
*Director of the United States Patent and Trademark Office*